United States Patent [19]

Brown et al.

[11] Patent Number: 4,759,522
[45] Date of Patent: Jul. 26, 1988

[54] OPERATOR'S SEAT MOUNTING ARRANGEMENT

[75] Inventors: Samuel K. Brown, Greencastle; Ricky L. Sites, Shippensburg, both of Pa.

[73] Assignee: Ingersoll-Rand Company, Woodcliff Lake, N.J.

[21] Appl. No.: 46,755

[22] Filed: May 7, 1987

[51] Int. Cl.[4] .................................. E04G 3/00
[52] U.S. Cl. ............................. 248/282; 248/424; 248/425; 297/241; 297/349
[58] Field of Search .............. 248/282, 424, 425; 296/65 R; 74/52; 397/241, 240, 349

[56] References Cited

U.S. PATENT DOCUMENTS

| | | | |
|---|---|---|---|
| 2,650,647 | 9/1953 | MacKnight | 297/349 X |
| 2,833,367 | 5/1958 | Pool et al. | 297/349 X |
| 3,043,622 | 7/1962 | Milner | 248/425 X |
| 3,134,568 | 5/1964 | Carson | 248/425 |
| 3,300,172 | 1/1967 | Noller et al. | 248/425 |
| 3,893,728 | 7/1975 | Holopainen | 296/65 R |
| 3,964,713 | 6/1976 | Joslyn et al. | 296/65 R X |
| 4,569,240 | 2/1986 | Obra | 74/52 |
| 4,620,686 | 11/1986 | Conant | 297/349 X |

OTHER PUBLICATIONS

Mechanisms, Linkages, and Mechanical Controls (N. P. Chironis, Product Engineering; pp. 21 and 79).

*Primary Examiner*—Ramon O. Ramirez
*Attorney, Agent, or Firm*—B. J. Murphy

[57] ABSTRACT

The arrangement, in a first embodiment, comprises a cantilevered beam which is journalled at one end of a fixed shaft and journals another shaft on the opposite end. The fixed shaft, secured to the base of a machine, has a first sprocket integral therewith, the other shaft has a second sprocket integral therewith, and an endless chain is looped about and engaged with both sprockets. Also, the other, journalled, shaft carries a seat mount to which an operator's seat is joined. The arrangement accommodates for (a) a sluing of the seat, and (b) positioning of the seat in lateral dispositions in a same attitude, or orientation relative to the machine.

3 Claims, 1 Drawing Sheet

OPERATOR'S SEAT MOUNTING ARRANGEMENT

This invention pertains to seating means, such as seating means for operators of vehicles, and the like, and in particular to an operator's seat mounting arrangement which accommodates for (a) sluing of the seat, and (b) positioning of the seat, at opposite sides of the vehicle in a same attitude, or orientation relative to the vehicle, or the like, on which the arrangement is installed.

With construction equipment, especially drum-type, earth or asphalt compactors, tractors, road planers, and such, there is a need, frequently, for the operator to move from one side of the equipment to the other, and back and forth, to monitor and guide the equipment in its work. It is particularly desirable, as well, that upon sluing to each side the operator can keep seated in a same attitude, or orientation, relative to the compactor, or the like as the latter tracks a given course and direction. It is an object of this invention to set forth just such a long sought operator's seat mounting arrangement.

It is particularly an object of this invention to set forth an operator's seat mounting arrangement, in a machine such as an earth compactor, a tractor, or the like, comprising an operator's seat; elongate, seat support means; and a base; wherein said support means is rotatably mounted, to said base to facilitate sluing of said means, relative to said base about an axis; said seat is coupled to said support means at a given radial distance from said axis; and said support means comprises turning means for causing said seat to rotate, in one of two, opposite, rotary directions, in response to a sluing of said support means, in the other of said two, opposite, rotary directions, about said axis.

Further objects of this invention, as well as the novel features thereof will become more apparent by reference to the following description taken in conjunction with the accompanying figures, in which.

Figure 2:
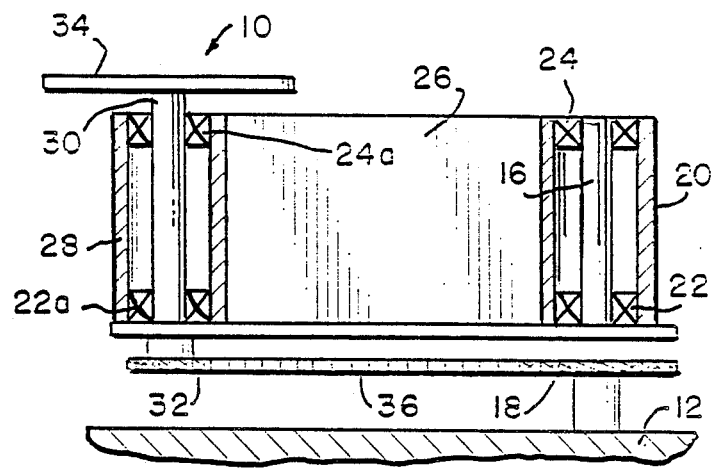
FIG. 2 is a side illustration of the embodiment of FIG. 1, the same being partially cross-sectioned.
Figure 1:
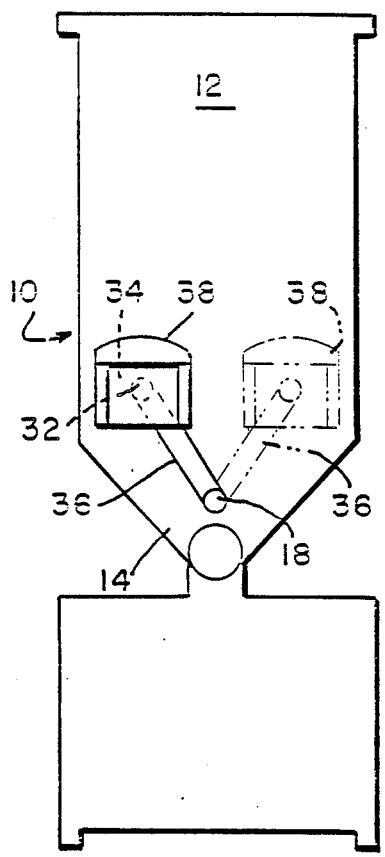
FIG. 1 is an outline drawing of an earth compactor showing, in simple line illustration, an embodiment of the invention associated therewith.
Figure 3:
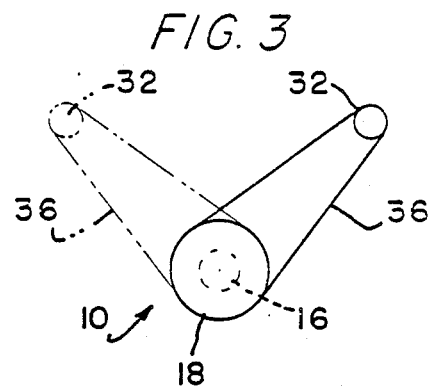
FIG. 3 is a schematic depiction of the sprockets and chain relationship of the FIGS. 1 and 2 embodiment.

As shown in FIGS. 1 through 4, a first embodiment of the novel arrangement 10 shows the same mounted to the frame, structure, or base 12 of a machine which, especially in FIG. 1, is outlined to represent an earth compactor 14. A shaft 16 is secured to the base 12, and has a sprocket 18 fixed thereto. A sleeve 20 is journalled on the shaft 16, by bearings 22 and 24, and a beam 26 extends from the sleeve 20 in cantilever fashion.

The extended, outermost end of the beam 26 is joined to a second sleeve 28. Similar bearings 22a and 24a, confined within the second sleeve 28, journal another shaft 30 therein. At opposite ends of shaft 30 are fixed a second sprocket 32 and a seat mount 34. Finally, an endless chain 36 is looped about and commonly engaged with both sprockets 18 and 32.

An operator's seat 38 can be fixed to the seat mount 34, by any suitable means. Then, by pushing with his feet (against the base 12), or by thrusting away from a fixed guard or railing (not shown), a seated operator can alter his location from one side of the machine (compactor 14) to the other. In sluing from side to side, as represented by the full-line and broken-line illustrations in FIGS. 1, 3 and 4, the operator will maintain his physical attitude, or orientation, relative to the machine, at each side thereof.

Figure 5:
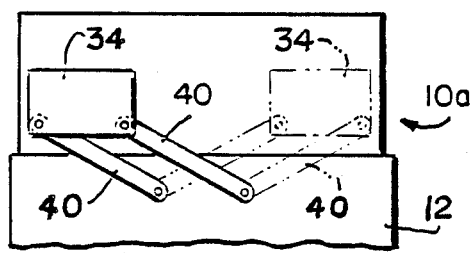
FIG. 5 illustrates, in simple line depiction, an alternative embodiment of the invention.
Figure 4:
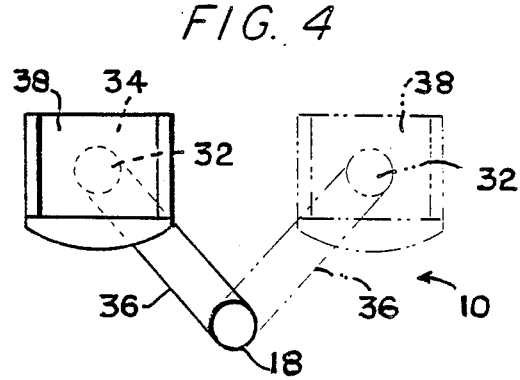
FIG. 4 is a simple illustration of an operator's seat carried on the rotating sprocket, and depicts the relationship of the latter to the chain and the fixed sprocket, according to the aforesaid embodiment.

FIG. 5 illustrates a rather simple embodiment 10a of the novel arrangement. Here a pair of parallel beams 40 are pivotably joined, in parallel, to the base 12 and to the seat mount 34.

Figure 6:
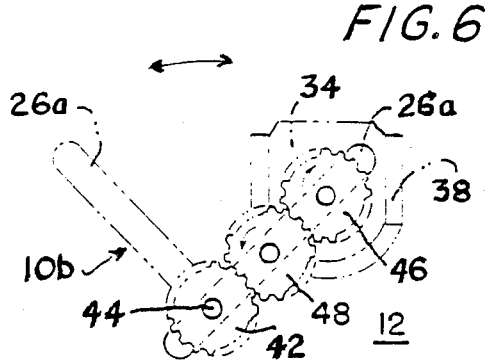
FIG. 6 shows another embodiment of the invention wherein the circular elements represent meshing gears.

A geared arrangement 10b, a further embodiment of the invention, is shown in FIG. 6. Here, a beam 26a has a first gear 42 centered on the rotary axis 44 of the arrangement and fixed to the base 12 (by means not shown). Toward the outermost end of the beam 26a is a second gear 46, the same being journalled on the beam. Then, a third gear 48, also journalled on the beam 26a, is in meshed engagement with the gears 42 and 46. The seat 38 is fixed to the second gear 46 through a seat mount 34 (not shown).

Figure 7:
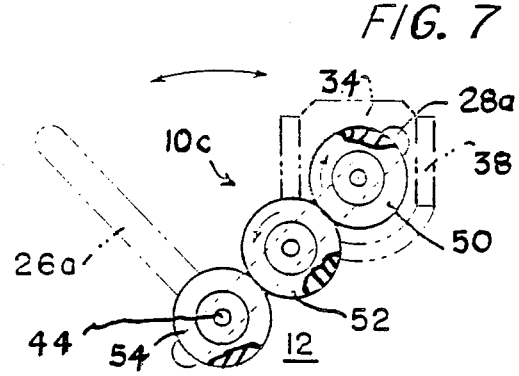
FIG. 7 illustrates yet a further embodiment of the invention which is similar to that of the FIG. 6 arrangement, but which employs rubber-rimmed wheels in lieu of gears.

Quite similar to the FIG. 6 embodiment is the arrangement 10c shown in FIG. 7. However, here the beam 26a has a pair of rubber-rimmed wheels 50 and 52 journalled thereon and in frictional engagement. A third, rubber-rimmed wheel, centered on the axis 44, and fixed to the base 12 (by means not shown), is in frictional engagement with wheel 52. It is wheel 50 which carries the operator's seat through a seat mount 34 (not seen).

While we have described our invention in connection with specific embodiments thereof, it is to be clearly understood that this is done only by way of example and not as a limitation to the scope of our invention as set forth in the objects thereof and in the appended claims.

We claim:

1. An operator's seat mounting arrangement, in a machine such as an earth compactor, a tractor, or the like, comprising:
   an operator's seat;
   elongate, seat support means; and
   a base; wherein
   said support means is rotatably mounted to said base to facilitate sluing of said means, relative to said base, about an axis;
   said seat is coupled to said support means at a given radial distance from said axis;
   said support means comprising turning means for causing said seat to rotate, in one of two, opposite, rotary directions, in response to a sluing of said support means, in the other of said two, opposite, rotary directions, about said axis;
   said support means further comprises a pair of beams; and
   said beams are disposed in parallel.

2. An arrangement, according to claim 1, wherein: said beams are of common length.

3. An operator's seat mounting arrangement, in a machine such as an earth compactor, a tractor, or the like, comprising:
   an operator's seat;
   elongate, seat support means; and
   a base; wherein
   said support means is rotatably mounted to said base to facilitate sluing of said means, relative to said base, about an axis;
   said seat is coupled to said support means at a given radial distance from said axis;
   said support means comprises turning means for causing said seat to rotate, in one of two, opposite, rotary directions, in response to a sluing of said support means, in the other of said two, opposite, rotary directions, about said axis;
   said support means further comprises a beam; and
   said turning means comprises a first sprocket fixed to said base and centered on said axis, a second sprocket journalled on said beam and coupled to said seat, and an endless chain engaged with both said sprockets.

* * * * *